US012308196B2

(12) United States Patent
Kao

(10) Patent No.: US 12,308,196 B2
(45) Date of Patent: May 20, 2025

(54) INSULATION DEVICE AND FUSE CUTOUT HAVING THE SAME

(71) Applicant: GOODWELL ELECTRIC CORPORATION, Taipei (TW)

(72) Inventor: Sui-Chan Kao, Taipei (TW)

(73) Assignee: GOODWELL ELECTRIC CORPORATION, Taipei (TW)

(*) Notice: Subject to any disclaimer, the term of this patent is extended or adjusted under 35 U.S.C. 154(b) by 0 days.

(21) Appl. No.: 18/516,994

(22) Filed: Nov. 22, 2023

(65) Prior Publication Data

US 2025/0104956 A1 Mar. 27, 2025

(30) Foreign Application Priority Data

Sep. 27, 2023 (TW) ................................ 112137115

(51) Int. Cl.
*H01H 31/12* (2006.01)
*H01H 85/20* (2006.01)

(52) U.S. Cl.
CPC ...... *H01H 85/2045* (2013.01); *H01H 31/127* (2013.01)

(58) Field of Classification Search
CPC ................. H01H 31/125–127; H01H 85/2045
See application file for complete search history.

(56) References Cited

U.S. PATENT DOCUMENTS 5,583,729 A * 12/1996 Hassler .................. H01H 85/12 361/39
2008/0174399 A1* 7/2008 Benke .................. H01H 31/127 337/168
2015/0270087 A1* 9/2015 Siebens ................ H01H 31/127 337/171
2016/0013004 A1* 1/2016 Kester ................ H01H 85/2045 337/202
2017/0345606 A1* 11/2017 Smith .................... H01H 85/43

FOREIGN PATENT DOCUMENTS

TW 202322171 6/2023
TW M653923 4/2024

OTHER PUBLICATIONS

Search Report for Taiwan counterpart application TW112137115, date Jul. 1, 2024.
KEnglish translation) Search Report for Taiwan counterpart application TW112137115,, date Jul. 1, 2024.

* cited by examiner

*Primary Examiner* — Jacob R Crum

(57) ABSTRACT

An insulation device is disclosed. The insulation device is used as an insulator of a fuse cutout, and comprises: a cylindrical insulating body, a plurality of first insulation sheds, an extending cylindrical insulating body horizontally connected to the cylindrical insulating body, and at least one second insulation shed, in which said first insulation shed is a circular fin extending radially outwardly from a side surface of the cylindrical insulating body, and the second insulation shed is also a circular fin extending radially outwardly from a side surface of the extending cylindrical insulating body. Compared to the conventional insulator of the fuse cutout, the insulation device according to the present invention has longer creepage distance because of additionally including the extending cylindrical insulating body and the at least one second insulation shed, so as to exhibit superior electrical performance under sever weather condition.

6 Claims, 5 Drawing Sheets

INSULATION DEVICE AND FUSE CUTOUT HAVING THE SAME

BACKGROUND OF THE INVENTION

1. Field of the Invention

The present invention relates to the technology field of fuse cutout, and more particularly to an insulation device for integration in a fuse cutout.

2. Description of the Prior Art

In electrical distribution, a fuse cutout or cut-out fuse (often referred to as a cutout) is a combination of a fuse and a switch, used in primary overhead feeder lines and taps to protect distribution transformers from current surges and overloads. FIG. 1 and FIG. 2 illustrates a side view and a stereo diagram of a conventional fuse cutout, respectively. With reference to FIG. 1 and FIG. 2, the conventional fuse cutout 1*a* comprises: an insulator 11*a*, a fuse tube assembly 12*a*, an upper mechanical member 13*a*, a upper terminal unit 14*a*, a spring copper sheet 10*a*, a lower contact assembly 17*a*, a lower terminal unit 16*a*, and a mounting member 18*a*, of which the fuse tube assembly 12*a* comprises a tube 120*a*, a conductor head 121*a* connected to a top end of the tube 120*a*, a pivotal connection unit 122*a* disposed on the tube 120*a*, and a lead wire accommodated in the tube 120*a*.

When making the fuse cutout 1*a* be in connection with a distribution transformer, the upper terminal unit 14*a* is connected to an overhead feeder line, and the lower terminal unit 16*a* is connected to a primary side of the distribution transformer. As such, an electric power is transmitted from the upper terminal unit 14*a* to the spring copper sheet 10*a* under the upper mechanical member 13*a*. Subsequently, the spring copper sheet 10*a* transmits the electric power to the fuse wire via the first conductor head 121*a*, and then the fuse wire transmits the electric power to the lower terminal unit 16*a* via the lower contact assembly 17*a*.

As described in more detail below, the upper terminal unit 14*a* comprises a first bolt 141*a*, a first pushing member 142*a* and a first screw nut 143*a*, and the lower terminal unit 16*a* consists of a mounting plate 160*a*, a second bolt 161*a*, a second pushing member 162*a*, and a second screw nut 163*a*. As FIG. 1 and FIG. 2 show, the spring copper sheet 10*a* consists of a first part 101*a*, a second part 102*a* and a third part 103*a*, in which the first part 101*a* and the second part 102*a* may be an integral piece that is attached to the upper mechanical member 13*a*, and the third part 103*a* is in connection with the conductor head 121*a*. When connecting the overhead feeder line to the upper terminal unit 14*a*, the overhead feeder line is disposed between the first part 101*a* and the first screw nut 143*a*, such that the overhead feeder line is tightly clamped by the first pushing member 142*a* and the first part 101*a* after driving the first pushing member 142*a* to push the overhead feeder line by screwing the first screw nut 143*a*. On the other hand, when connecting an electrical cable to the lower terminal unit 16*a*, the electrical cable is disposed between the mounting plate 160*a* and the second screw nut 163*a*, such that the electrical cable is tightly clamped by the second pushing member 162*a* and the mounting plate 160*a* after driving the second pushing member 162*a* to push the electrical cable by screwing the second screw nut 163*a*.

With reference to FIG. 1 and FIG. 2, the insulator 11*a* is made of a ceramic material, and consists of a main insulation body 10*a* and a plurality of weathering skirts 111*a* formed along the side surface of the main insulation body 10*a*. Practical experiences have indicated that the weathering skirts 111*a* can contribute to the creepage distance of the insulator 11*a*. However, the insulator 11*a* shown as FIG. 1 and FIG. 2 may have inadequate creepage distance in the case of a fixed device size (e.g., length of the main insulation body 10*a*), so that the insulator 11*a* is subject to damage easily because of a lack of enough insulation leakage distance.

According to above descriptions, it is understood that there is still room for improvement in the insulator 11*a* of the conventional fuse cutout 1*a*. In view of this fact, inventors of the present application have made great efforts to make inventive research and eventually provided an insulation device for integration in a fuse cutout.

SUMMARY OF THE INVENTION

The primary objective of the present invention is to disclose an insulation device for integration with a fuse cutout. The insulation device is used as an insulator of a fuse cutout, and comprises: a cylindrical insulating body, a plurality of first insulation sheds, an extending cylindrical insulating body horizontally connected to the cylindrical insulating body, and at least one second insulation shed, in which said first insulation shed is a circular fin extending radially outwardly from a side surface of the cylindrical insulating body, and the second insulation shed is also a circular fin extending radially outwardly from a side surface of the extending cylindrical insulating body. Compared to the conventional insulator of the fuse cutout, the insulation device according to the present invention has an internal blocking path for disconnecting metal connection members and a longer creepage distance and/or a leakage distance because of additionally including the extending cylindrical insulating body and the at least one second insulation shed, so as to exhibit superior performance in high voltage protecting system.

For achieving the primary objective mentioned above, the present invention provides an embodiment of the insulation device for being used as an insulator of a fuse cutout, comprising:

- a cylindrical insulating body;
- a plurality of first insulation sheds, wherein each said first insulation shed is a circular fin extending radially outwardly from a side surface of the cylindrical insulating body;
- an extending cylindrical insulating body, being horizontally connected to the cylindrical insulating body; and
- at least one second first insulation sheds, wherein the second insulation shed is also a circular fin that extends radially outwardly from a side surface of the extending cylindrical insulating body.

In one embodiment, the cylindrical insulating body comprises:

- a center part, wherein the extending cylindrical insulating body is horizontally connected to the center part;
- an upper part, being connected to a top of the center part, and has an upper connection member; and
- a lower part, being connected to a tail of the center part, and has a lower connection member.

In one practicable embodiment, the insulation device further comprises a first structure assembly, and the first structure assembly comprises:

- a first rod-shaped insulation structural member, being buried in the cylindrical insulating body;

a center connecting unit, comprising a first ferrule sleeved on a center section of the first rod-shaped insulation structural member and an extending ferrule horizontally connected to the first ferrule;

an upper connecting unit, comprising a second ferrule sleeved on an upper section of the first rod-shaped insulation structural member and a first connection member extending from a side surface of the second ferrule; and a lower connecting unit, comprising a third ferrule sleeved on a lower section of the first rod-shaped insulation structural member and a second connection member extending from a side surface of the third ferrule;

wherein the first ferrule, the second ferrule and the third ferrule are buried in the cylindrical insulating body, and the extending ferrule is buried in the extending cylindrical insulating body.

In another one practicable embodiment, the insulation device further comprises a second structure assembly, and the second structure assembly comprises:

a second rod-shaped insulation structural member, being inserted into the extending ferrule by a first end thereof;

a ferrule, being connected to a second end of the second rod-shaped insulative structural member by an opening thereof; and a mounting member, being connected to a bottom of the ferrule;

wherein the second rod-shaped insulation structural member and the ferrule are buried in the extending cylindrical insulating body, and the mounting member is positioned outside the extending cylindrical insulating body.

In one embodiment, the first insulation shed and the second insulation shed have a first diameter and a second diameter, respectively.

In addition, the present invention also provides an embodiment of a fuse cutout, which is characterized in that comprising an insulation device used as an insulator thereof, and the insulation device comprising:

a cylindrical insulating body;

a plurality of first insulation sheds, wherein each said first insulation shed is a circular fin extending radially outwardly from a side surface of the cylindrical insulating body;

an extending cylindrical insulating body, being horizontally connected to the cylindrical insulating body; and at least one second first insulation sheds, wherein the second insulation shed is also a circular fin that extends radially outwardly from a side surface of the extending cylindrical insulating body.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an insulation device for integration in a fuse cutout according to the present invention, embodiment of the present invention will be described in detail with reference to the attached drawings hereinafter.

Figure 1:
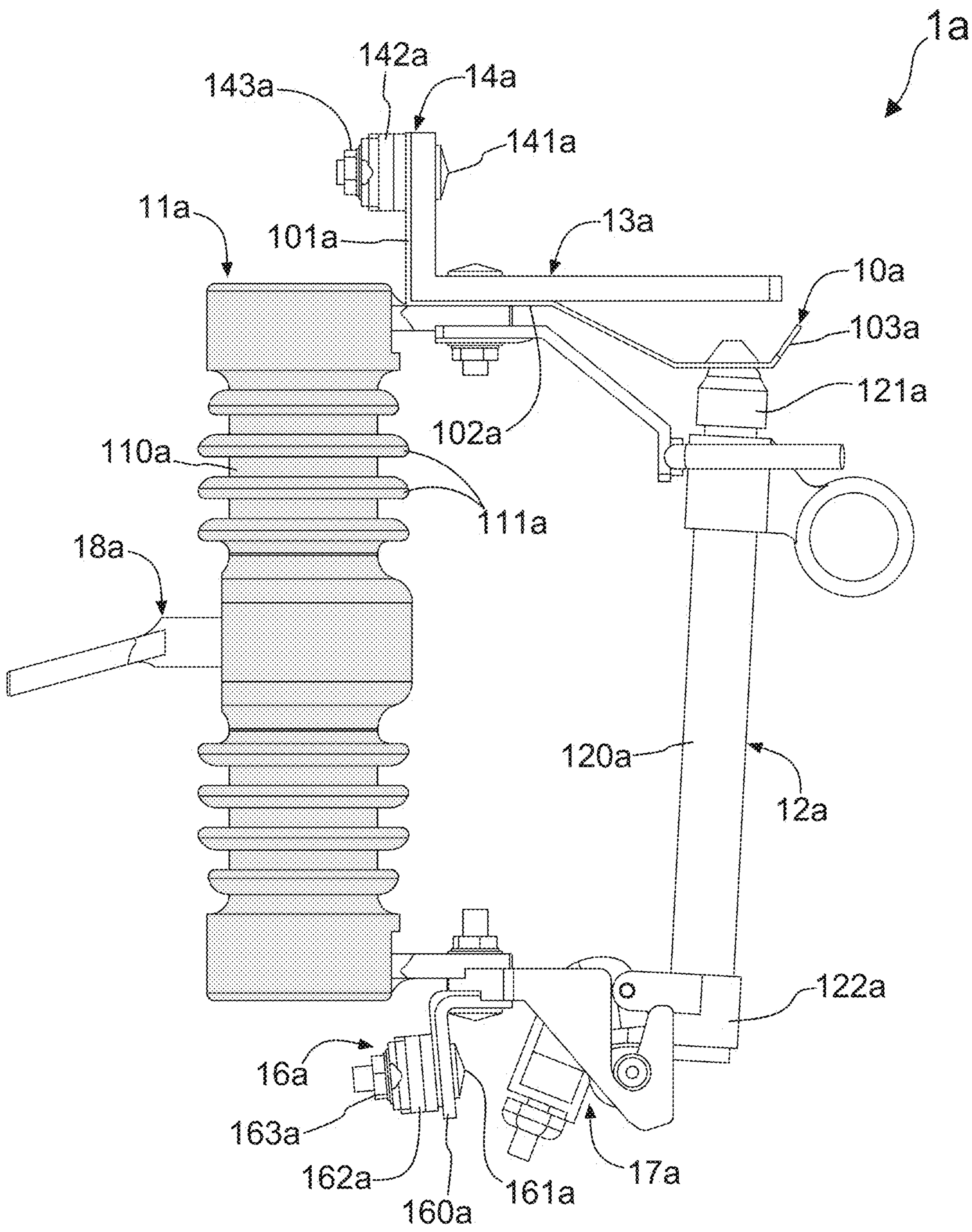
FIG. 1 (Prior art)
FIG. 1 shows a side view of a conventional fuse cutout.
Figure 2:
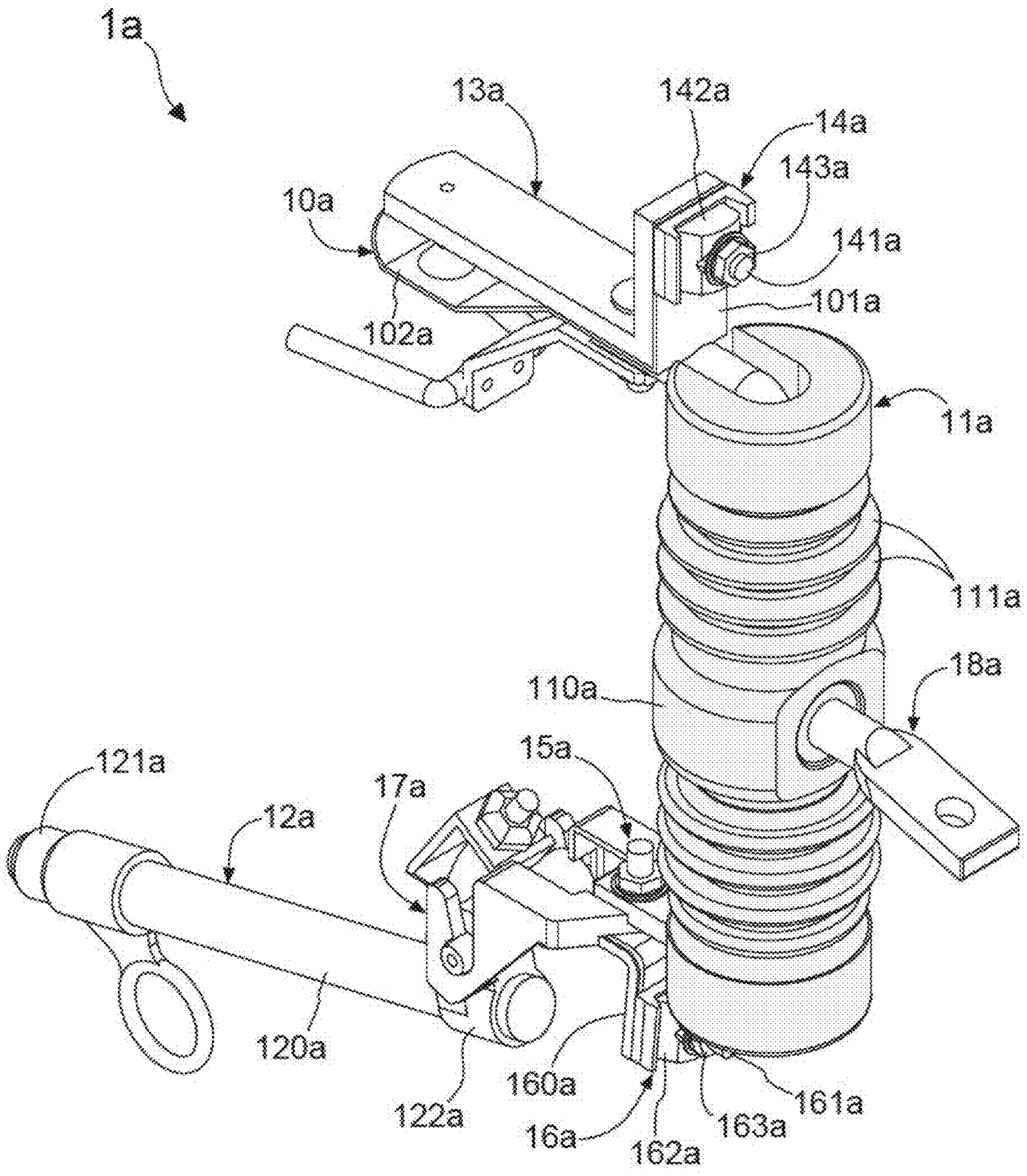
FIG. 2 (Prior art)
FIG. 2 shows a stereo diagram of the conventional fuse cutout.
Figure 3:
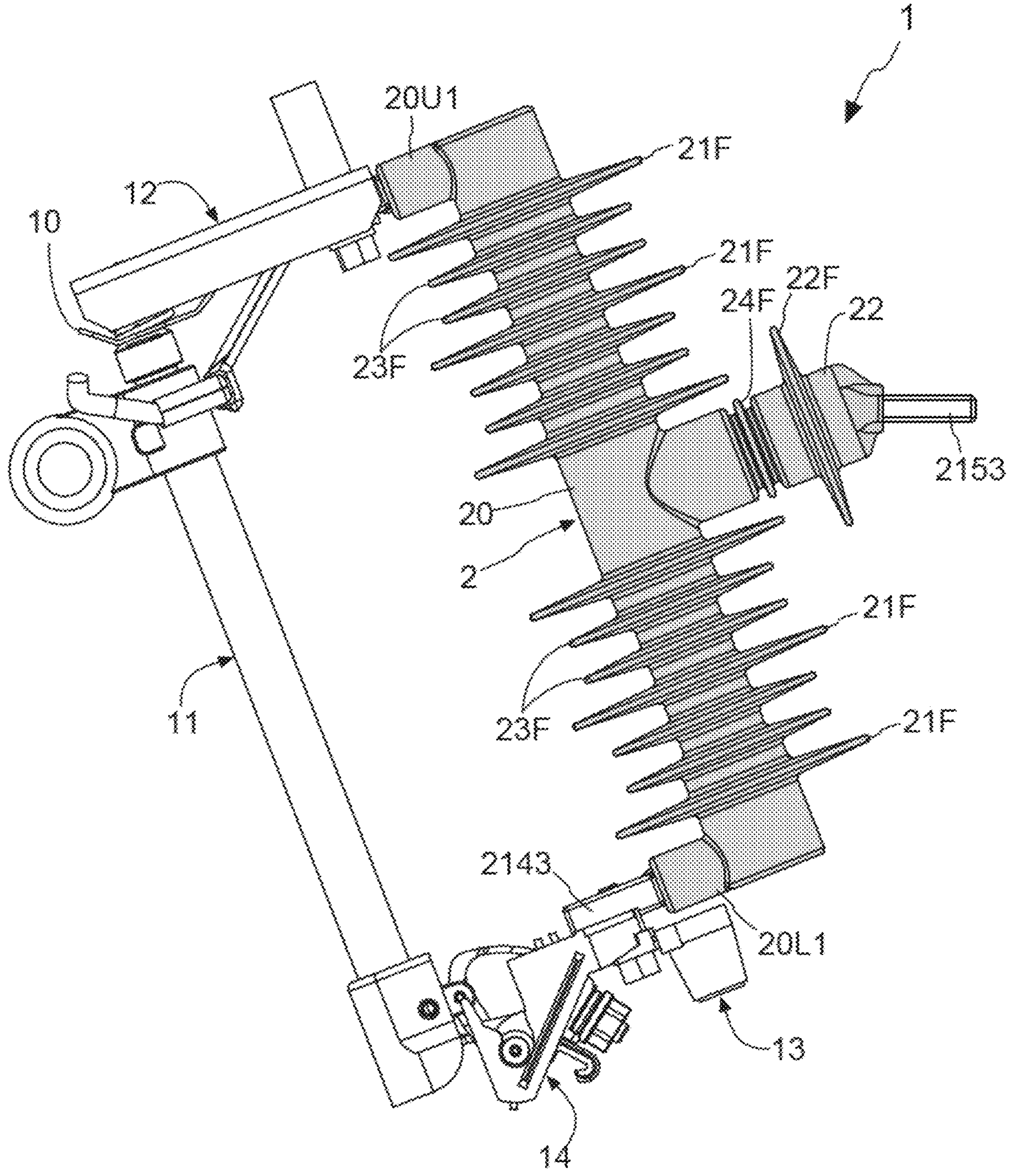
FIG. 3 shows a side view of a fuse cutout including an insulation device according to the present invention.
Figure 4:
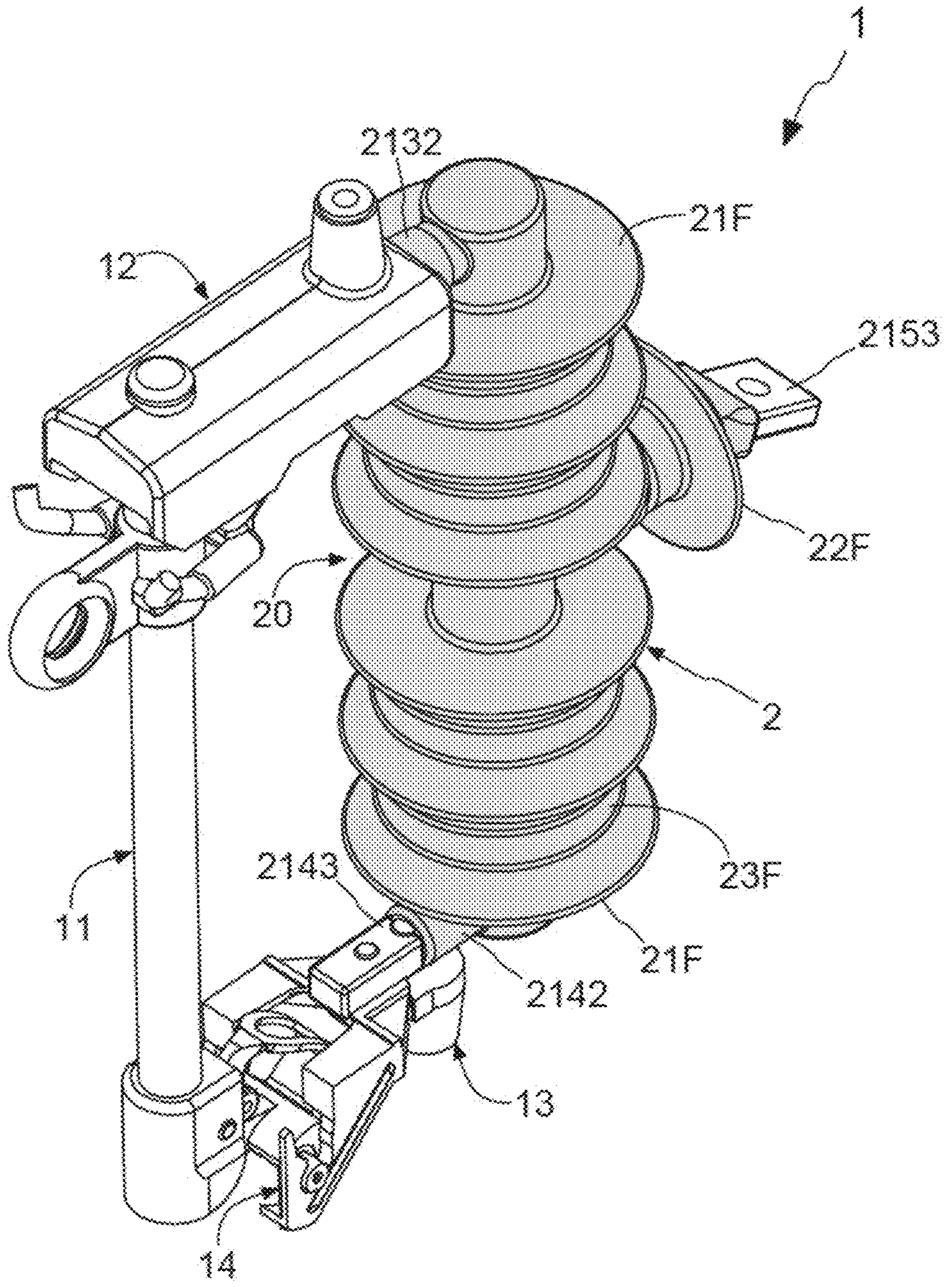
FIG. 4 shows a stereo diagram of the fuse cutout including the insulation device according to the present invention.

FIG. 3 shows a side view of a fuse cutout 1 including an insulation device 2 according to the present invention, and FIG. 4 illustrates a stereo diagram of the fuse cutout 1. With reference to FIG. 3 and FIG. 4, the fuse cutout 1 comprises the insulation device 2 of the present invention used as an insulator thereof, and further comprises: a fuse tube assembly 11, an upper contact assembly 12, a spring contact sheet 10, a lower contact assembly 14 including pivotal connection structure, and a lower terminal unit 13.

Figure 5:
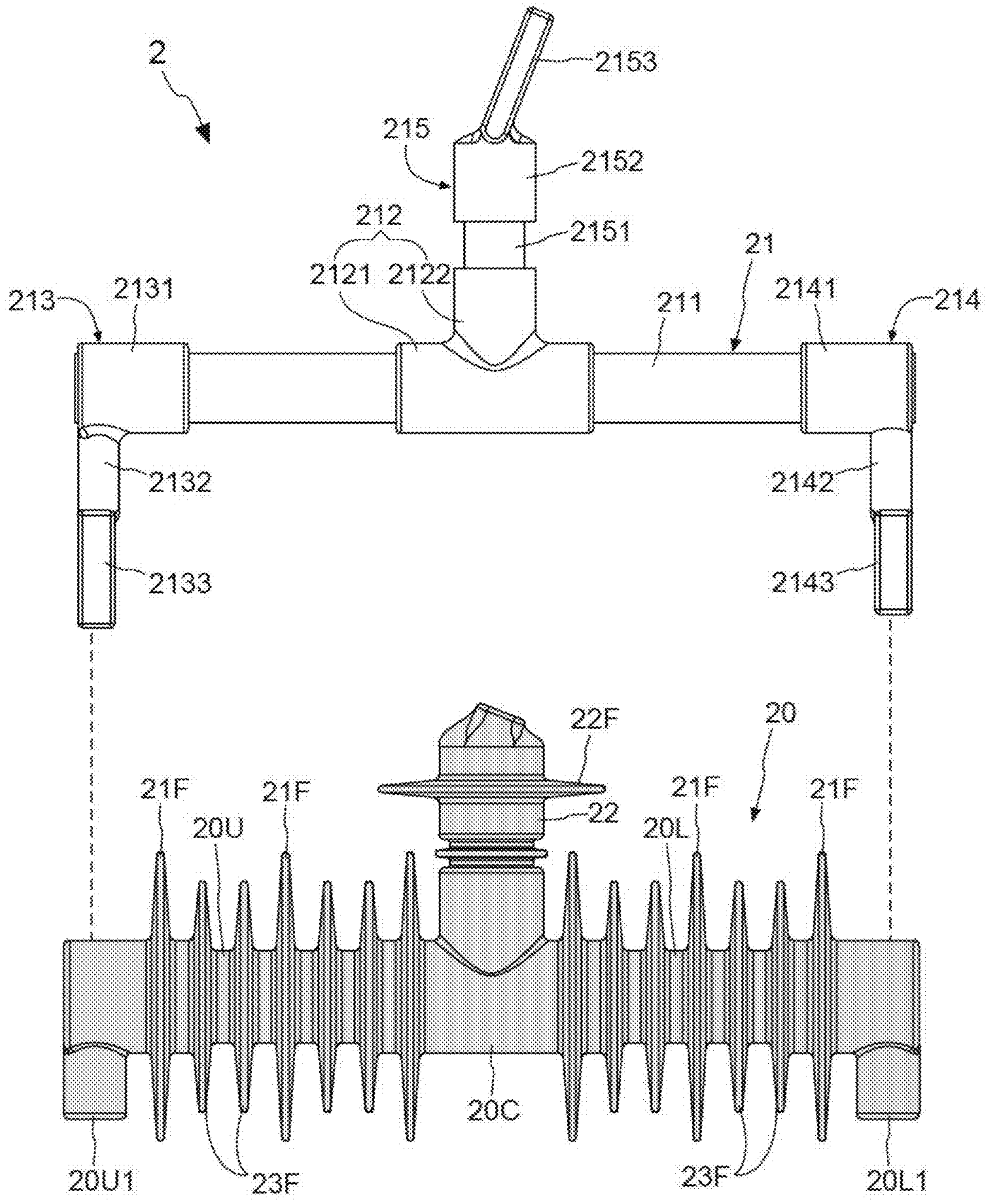
FIG. 5 show a side view of the insulation device according to the present invention.

FIG. 5 show a side view of the insulation device 2 according to the present invention. With reference to FIG. 3, FIG. 4 and FIG. 5, the insulation device 2 of the present invention comprises: a cylindrical insulating body 20, a first structure assembly 21, a plurality of first insulation sheds 21F, an extending cylindrical insulating body 22, at least one second first insulation sheds 22F, and a second structure assembly 215, in which the extending cylindrical insulating body 22 is horizontally connected to the cylindrical insulating body 20. Moreover, each said first insulation shed 21F is a circular fin extending radially outwardly from a side surface of the cylindrical insulating body 20, and the second insulation shed 22F is also a circular fin that extends radially outwardly from a side surface of the extending cylindrical insulating body 22. When manufacturing the insulation device 2, the cylindrical insulating body 20, the plurality of first insulation sheds 21F, the extending cylindrical insulating body 22, and at least one second first insulation sheds 22F are integrally formed by adopting electrical-grade insulation material as well as using proper rubber molding technology.

As described in more detail below, the cylindrical insulating body 20 comprises: a center part 20C, an upper part 20U and a lower part 20L, wherein the extending cylindrical insulating body 22 is horizontally connected to the center part 20C, the upper part 20U is connected to a top of the center part 20C, and the lower part 20L is connected to a tail of the center part 20C. In addition, the upper part 20U has an upper connection member 20U1, and the lower part 20L has a lower connection member 20L1.

According to the present invention, the first structure assembly 21 comprises a first rod-shaped insulation structural member 211, a center connecting unit 212, an upper connecting unit 213, and a lower connecting unit 214, of which the first rod-shaped insulative structural member 211 is buried in the cylindrical insulating body 20. As FIG. 4 shows, the center connecting unit 212 is a metal article, and consists of a first ferrule 2121 sleeved on a center section of the first rod-shaped insulation structural member 211 and an extending ferrule 2122 horizontally connected to the first ferrule 2121. On the other hand, the upper connecting unit 213 consists of a second ferrule 2131 sleeved on an upper section of the first rod-shaped insulation structural member 211 and a first connection member 2132 extending from a side surface of the second ferrule 2131. Moreover, the lower connecting unit 214 consists of a third ferrule 2141 sleeved on a lower section of the first rod-shaped insulation structural member 211 and a second connection member 2142 extending from a side surface of the third ferrule 2141. With reference to FIG. 3, FIG. 4 and FIG. 5, the first ferrule 2121, the second ferrule 2131 and the third ferrule 2141 are buried in the cylindrical insulating body 20, and the extending ferrule 2122 is buried in the extending cylindrical insulating body 22.

On the other hand, the second structure assembly 215 is made of metal, and comprises a second rod-shaped insulation structural member 2151, a ferrule 2152 and a mounting member 2153, of which the second rod-shaped insulation structural member 2151 is inserted into the extending ferrule 2122 by a first end thereof. According to the present invention, the ferrule 2152 is connected to a second end of the second rod-shaped insulation structural member 2151 by an opening thereof, and the mounting member 2153, being connected to a bottom of the ferrule 2152. Moreover, FIG. 3, FIG. 4 and FIG. 5 depict that the second rod-shaped insulation structural member 2151 and the ferrule 2152 are buried in the extending cylindrical insulating body 22, and the mounting member 2153 is positioned outside the extending cylindrical insulating body 22. As described in more detail below, the first connection member 2132 protrudes out of the upper connection member 20U1 by a front end 2133 thereof. In contrast to the first connection member 2132, the second connection member 2142 protrudes out of the lower connection member 20L 1 by a front end 2143 thereof.

In one practicable embodiment, a plurality of third insulation sheds 23F are formed on the cylindrical insulating body 20. As FIG. 5 shows, each said third insulation shed 23F is a circular fin extending radially outwardly from the side surface of the cylindrical insulating body 20, such that each two said first insulation sheds 21F are provided with at least one said third insulation shed 23F there between. Particularly, according to FIG. 3, FIG. 4 and FIG. 5, the first insulation shed 21F and the second insulation shed 22F have a first diameter and a second diameter, respectively.

Therefore, through above descriptions, all embodiment and their constituting elements of the insulation device 2 for used as an insulator of the fuse cutout 1 have been introduced completely and clearly. In summary, the present invention includes the advantages of:

(1) the present invention provides an insulation device 2, which is used as an insulator of a fuse cutout 1, and comprising: a cylindrical insulating body 20, a plurality of first insulation sheds 21F, an extending cylindrical insulating body 22 horizontally connected to the cylindrical insulating body 20, and at least one second insulation shed 22F, in which said first insulation shed 21F is a circular fin extending radially outwardly from a side surface of the cylindrical insulating body 20, and the second insulation shed 22F is also a circular fin extending radially outwardly from a side surface of the extending cylindrical insulating body 22. Compared to the conventional insulator of the fuse cutout, the insulation device 2 according to the present invention has an internal blocking path by insulating structure member 2151 for disconnecting metal connection members and a longer creepage distance and/or a leakage distance because of additionally including the extending cylindrical insulating body 22 and the at least one second insulation shed 22F, so as to exhibit superior electrical performance under sever weather condition.

Moreover, the above description is made on embodiment of the present invention. However, the embodiment are not intended to limit the scope of the present invention, and all equivalent implementations or alterations within the spirit of the present invention still fall within the scope of the present invention.

What is claimed is:

1. An insulation device for integration in a fuse cutout, comprising:

a cylindrical insulating body;

a plurality of first insulation sheds, wherein each said first insulation shed is a circular fin extending radially outwardly from a side surface of the cylindrical insulating body;

an extending cylindrical insulating body, being horizontally connected to the cylindrical insulating body;

at least one second first insulation sheds, wherein the second insulation shed is also a circular fin that extends radially outwardly from a side surface of the extending cylindrical insulating body; and a first structure assembly, comprising:

a first rod-shaped insulation structural member, being buried in the cylindrical insulating body;

a center connecting unit, comprising a first ferrule sleeved on a center section of the first rod-shaped insulation structural member and an extending ferrule horizontally connected to the first ferrule;

an upper connecting unit, comprising a second ferrule sleeved on an upper section of the first rod-shaped insulation structural member and a first connection member extending from a side surface of the second ferrule; and a lower connecting unit, comprising a third ferrule sleeved on a lower section of the first rod-shaped insulation structural member and a second connection member extending from a side surface of the third ferrule;

wherein the first ferrule, the second ferrule and the third ferrule are buried in the cylindrical insulating body, and the extending ferrule is buried in the extending cylindrical insulating body.

2. The insulation device of claim 1, wherein the cylindrical insulating body comprises:

a center part, wherein the extending cylindrical insulating body is horizontally connected to the center part;

an upper part, being connected to a top of the center part, and has an upper connection member; and a lower part, being connected to a tail of the center part, and has a lower connection member.

3. The insulation device of claim 1, wherein the first connection member protrudes out of the upper connection member by a front end thereof.

4. The insulation device of claim 1, wherein the second connection member protrudes out of the lower connection member by a front end thereof.

5. The insulation device of claim 1, wherein the first insulation shed and the second insulation shed have a first diameter and a second diameter, respectively.

6. A fuse cutout, comprising an insulation device used as an insulator thereof, and the insulation device comprising:

a cylindrical insulating body;

a plurality of first insulation sheds, wherein each said first insulation shed is a circular fin extending radially outwardly from a side surface of the cylindrical insulating body;

an extending cylindrical insulating body, being horizontally connected to the cylindrical insulating body;

at least one second first insulation sheds, wherein the second insulation shed is also a circular fin that extends radially outwardly from a side surface of the extending cylindrical insulating body; and a first structure assembly, comprising:

a first rod-shaped insulation structural member, being buried in the cylindrical insulating body;

a center connecting unit, comprising a first ferrule sleeved on a center section of the first rod-shaped insulation structural member and an extending ferrule horizontally connected to the first ferrule;

an upper connecting unit, comprising a second ferrule sleeved on an upper section of the first rod-shaped insulation structural member and a first connection member extending from a side surface of the second ferrule; and a lower connecting unit, comprising a third ferrule sleeved on a lower section of the first rod-shaped insulation structural member and a second connection member extending from a side surface of the third ferrule;

wherein the first ferrule, the second ferrule and the third ferrule are buried in the cylindrical insulating body, and the extending ferrule is buried in the extending cylindrical insulating body.

* * * * *